United States Patent [19]

Tajima

[11] 4,124,217
[45] Nov. 7, 1978

[54] SIGNAL PICK-UP APPARATUS FOR REPRODUCING A RECORDING DISC

[75] Inventor: Osamu Tajima, Ayase, Japan

[73] Assignee: Victor Company of Japan, Ltd., Yokohama, Japan

[21] Appl. No.: 786,787

[22] Filed: Apr. 12, 1977

[30] Foreign Application Priority Data

Apr. 12, 1976 [JP] Japan ................................. 51-40243
Apr. 12, 1976 [JP] Japan ................................. 51-40244

[51] Int. Cl.² .............................................. G11B 3/02
[52] U.S. Cl. ............................... 274/37; 179/100.1 B
[58] Field of Search ...................... 274/23 R, 23 A, 37; 358/128; 179/100.1 B, 100.41 G

[56] References Cited

U.S. PATENT DOCUMENTS 3,858,889  1/1975  Hagenah ............................... 274/37
3,917,903  11/1975 Taylor et al. .................. 179/100.41 G
3,952,145  4/1976  Allen ............................ 179/100.41 G
4,040,635  8/1977  Leedom ................................ 274/37

Primary Examiner—Charles E. Phillips

[57] ABSTRACT

In a signal pick-up apparatus for reproducing a recording disc, a pick-up cartridge casing is detachably loaded at a predetermined position on a pick-up apparatus structure. An arm is rotatably supported at one end thereof, within the casing. At its other end, the pick-up arm has a reproducing stylus which contacts the recording disc, an elastic member for supporting the pick-up arm with respect to said arm support member, and a member for urging the arm support member in a direction which accommodates the pick-up arm within said casing. The other end of the arm support member is depressed, within a direction for causing the reproducing stylus to contact the recording disc and further causing the elastic member to deform after a contact between of the reproducing stylus and the recording disc.

10 Claims, 10 Drawing Figures

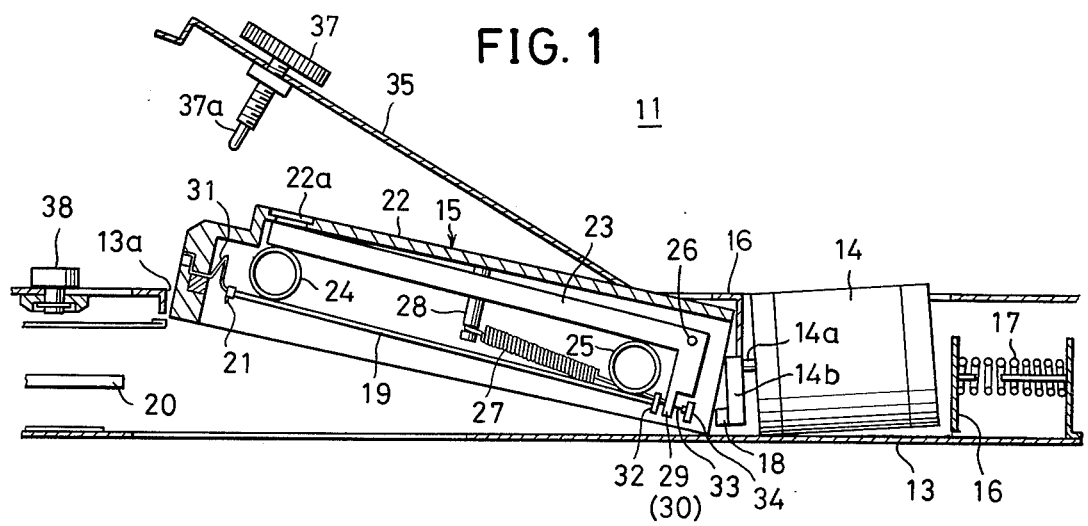
FIG. 1
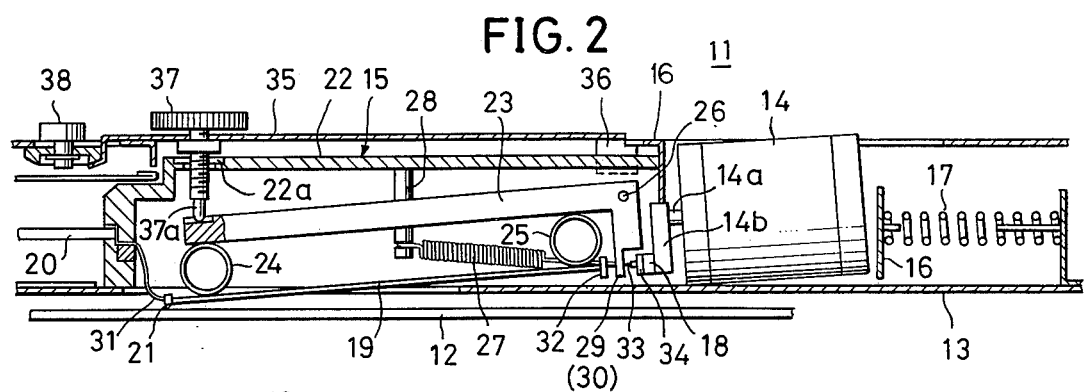
FIG. 2
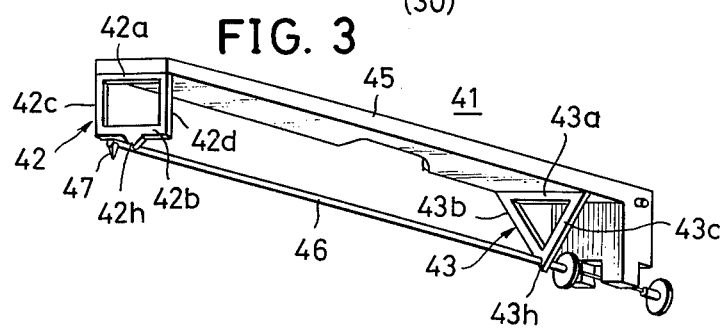
FIG. 3
FIG. 4A
FIG. 4B
FIG. 4C
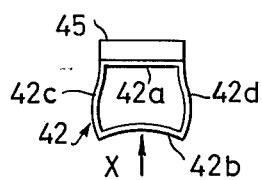
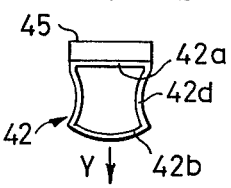
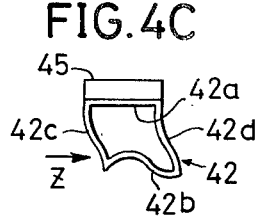

SIGNAL PICK-UP APPARATUS FOR REPRODUCING A RECORDING DISC

BACKGROUND OF THE INVENTION

The present invention relates to signal pick-up apparatus for reproducing recording discs, and more particularly to a pick-up cartridge which is detachable from a pick-up apparatus structure. There is a structure for accommodating a reproducing stylus within the interior of the cartridge without deformation of a stylus pressure exerting member. The reproducing stylus is brought into contact with the recording disc at a predetermined stylus pressure when the pick-up cartridge is loaded in the apparatus structure.

In general, an apparatus reproduces an information signal by tracing a record groove, with a reproducing stylus. The information signals have been previously recorded in high density in the grooves. The structure including the reproducing stylus is incorporated within a cartridge which may be detachably loaded into the pick-up apparatus so that it may be replaced when the stylus wears out.

The cartridge known heretofore includes a cartridge casing containing a pick-up arm and a elastic damper material for exerting a stylus force responsive to an elastic deformation. Particularly, the elastic material is interposed between the inner wall of the casing and the pick-up arm. Accordingly, when the cartridge is not used or is not loaded in the pick-up apparatus structure, the elastic damper material is compressed to accommodate the reproducing stylus within the cartridge casing, thus protecting the reproducing stylus from unexpected damage. After a long period in an unused state, the damper will have deformation even when the compression force for the elastic material is released by loading the cartridge into the pick-up apparatus structure. Therefore, difficulties arise since the normal stylus pressure can not be exerted upon the stylus and the dynamic signal detection characteristic deteriorates, in the extreme.

SUMMARY OF THE INVENTION

Accordingly, a general object of the present invention is to provide a novel and useful signal pick-up apparatus for reproducing the recording disc in which the above described difficulties are overcome.

Another object of the present invention is to provide a signal pick-up apparatus for reproducing a recording disc. This apparatus comprises a pick-up cartridge which is detachably loaded at a predetermined position into a pick-up apparatus structure. A depressing member is provided in the apparatus structure. The pick-up cartridge comprises an arm support member rotatably supported at one end part within a pick-up cartridge casing. A pick-up arm has, at its distal end, a reproducing stylus which contacts the recording disc during reproduction. An elastic member supports the pick-up arm with respect to its arm support member. Another member urges the arm support member in a direction for accommodating said pick-up arm within said casing. The depressing member depresses the other end of the arm support member in the pick-up cartridge which has been loaded at the predetermined position of the apparatus structure. The depressing member causes the reproducing stylus of the pick-up arm to contact the recording disc and further causes the elastic member to deform after contact is accomplished. According to the pick-up apparatus of the invention, the elastic member will not have a deformation even after a long period in an unused state.

A further object of the present invention is to provide a signal pick-up apparatus for reproducing a recording disc, in which the stylus pressure can be adjusted. This adjustment is achieved by changing the amount of elastic deformation of a member which is used for exerting stylus pressure, by means of a depressing member which is provided in a pick-up apparatus structure.

A still further object of the present invention is to provide a signal pick-up apparatus for reproducing a recording disc, in which a pick-up arm is supported or held by a frame-shaped damper. The frame plane is set perpendicular to a longitudinal direction of the arm. In accordance with this arrangement, the tracking characteristic of the apparatus is improved.

Further objects and features of the present invention will be apparent from the following detailed description when read in conjunction with the accompanying drawings.

BRIEF DESCRIPTION OF THE DRAWINGS

In the drawings:

FIG. 1 and FIG. 2 are elevations, in vertical section, respectively showing one embodiment of a signal pick-up apparatus for reproducing a recording disc, according to the present invention, in states where a pick-up cartridge is halfway loaded and where there is a reproduction after the cartridge is loaded;

FIG. 3 is a perspective view of another embodiment of the cartridge according to the present invention;

FIGS. 4A, 4B and 4C are schematic views respectively showing deformed states of the damper illustrated in FIG. 3;

DETAILED DESCRIPTION

Figure 5:
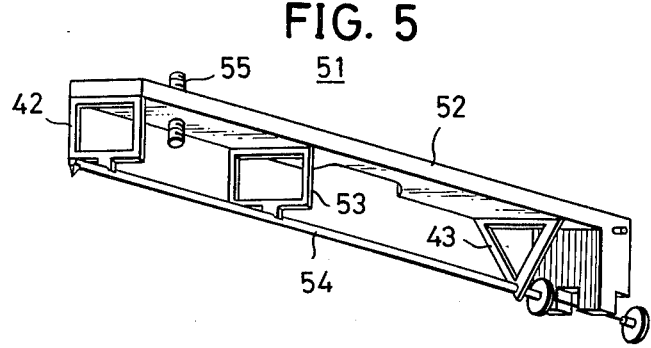
FIG. 5 and FIG. 6 are perspective views respectively showing other embodiments of the cartridge.

In FIGS. 1 and 2, a pick-up apparatus 11 picks up video signals which have been recorded, with high density, on a rotary recording disc 12 (referred to as "video disc" hereinafter). The pick-up is accomplished by detecting a change of electrostatic capacitance. The video disc 12 is made of vinyl chloride, with a diameter of 300 mm and a thickness of 1.5 to 2.0 mm, for instance.

In the pick-up apparatus 11, a housing 13 is supported at a distance of about 2 mm above the video disc 12. It is shifted by a feed mechanism (not shown) in a radial direction across the video disc 12 toward the rotating center thereof. The interior of the housing 13 incorporates an arm-stretcher 14 of the type shown in U.S. Pat. No. 3,711,641 for correcting jitter, a cavity resonator (not shown) and the like. A pick-up cartridge 15 is inserted or loaded in a detachable manner through an opening 13a formed on the top plate of the casing 13.

The arm-stretcher 14 is fixed to a bracket 16 within the housing 13. The bracket 16 is a U-shaped member, the two legs of which are seen at 16, 16 in the drawing. The arm-stretcher 14 is attached to the bracket, in the bottom of the "U", which is not seen in the plane of the cross section represented in FIGS. 1 and 2. Also, the arm-stretcher 14 is set at an angle with respect to the bracket 16, 16 so that the arm-stretcher acts linearly, with respect to the stylus arm 19, when the stylus is in the playback position (FIG. 2). The bracket 16 may be slidable and is urged to the left (FIG. 1) by a spring 17. A permanent magnet 18 is fitted on an arm member 14b mounted on a shaft 14a of the arm-stretcher 14. A pick-up arm 19 in the cartridge 15 is mechanically connected to the shaft 14a by the force of the magnet 18. The cavity resonator has a center conductor 20 which is electrically connected to a stylus 21 when the pick-up cartridge 15 is placed at a predetermined position within the pick-up apparatus 11.

The pick-up cartridge 15 has a plastic casing 22 made in a hollow rectangular form with a base and one side thereof cut away. In the interior of the cartridge casing 22 there is a pick-up arm 19, an arm supporting lever 23, a couple of ring-shaped dampers 24, 25, and the like.

The supporting lever 23 has a plane plate extending longitudinally and a bent part formed on one end thereof at substantially a right angle. The bent part of lever 23 is supported by a spring pin 26 for rotation within a certain angle in the cartridge casing 22. A coiled spring 27 is stretched between a stud 28 embedded in a lower surface of the top wall of the cartridge casing 22 and a leg part 29 (among a couple of leg parts) formed at the lower end of the lever 23. Therefore, the lever 23 is urged in a counterclockwise direction about the pin 26.

Ring-shaped dampers 24 and 25 elastically fix and support both ends of the pick-up arm 19 on the lever arm 23. The stylus 21 is electrically connected, FIG. 2, to the conductor 20 by way of a foil 31 made of gold, for instance. A stopper 32 is fixed on the pick-up arm 19 in the vicinity of its proximal end. One end of a piano wire 33 extending between a couple of leg parts 29 and 30 of the lever 23 is fixed to the stopper 32. The other end of the piano wire 33 is fixed to a disc 34 made of iron.

The ring-shaped dampers 24 and 25 are made of a material having a great viscous elasticity, such as butyl rubber. They are respectively fixed by an adhesive agent, at diametrically opposite points to the lever 23 and to both ends of the pick-up arm 19. The stylus pressure of the stylus 21 is preset to a predetermined value through the change of the initial deformation of the ring-shaped dampers 24 and 25.

A cover 35 is rotatably fitted at hinge 36 to the top plate of the housing 13 of the pick-up apparatus 11 so that it may open or close. An adjust screw 37 is threadably engaged at a proper position near the distal end of the cover 35. The distance which the screw 37 projects through the housing is adjusted by a manipulation of the screw housing is adjusted by a manipulation of the screw from the outside of the housing. The push-pin is integral with the end of the screw. Therefore, the distance which the push-pin projects inside the housing is also adjusted by manipulating the screw from the outside of the housing. When the corver 35 is closed after loading the pick-up cartridge 15 into the housing 13, the adjust screw 17 passes through a hole 22a formed in the cartridge casing 22 and abuts against the lever 23 thereby causing the lever 23 to be displaced downwardly by a predetermined distance. A slide knob 38 at the top plate of the housing 13 is adapted to lock the cover 35 and to prevent it from opening. When it slides in one direction (i.e., toward the right in FIG. 2) after closing the cover Before the cartridge 15 is loaded into the housing 13, the lever 23 is rotated by a tensile force of the spring 27, in the clockwise direction shown in FIG. 1, to a position where it abuts against the inner wall of the top plate of the cartridge casing 22. Accordingly, the pick-up arm 19 and the ring-shaped dampers 24 and 25 are also positioned at the above described position where the rotation in the clockwise direction is restricted. The stylus 21 is completely retracted within the cartridge casing 22.

In this state, the ring-shaped dampers 24 and 25 respectively support the pick-up arm 19. Since the weight of the pick-up arm 19 is small, the deformation of the ring-shaped dampers 24 and 25 is restricted and is so small that it can be substantially neglected.

When the pick-up cartridge 15 is to be loaded, the cover 35 will first be opened. Then, the cartridge casing 22 is inserted with its rear side facing downward, obliquely through the opening 13a. The rear part of cartridge 22 is inserted between the bracket 16 and the bottom plate of the casing 13. The cartridge casing 22 is further inserted or pushed counter to the spring 17, thereby causing the arm-stretcher 14 to be displaced to a position where its sliding movement is limited. As a result of the displacement of the arm-stretcher 14, the front part of the cartridge casing 22 is pushed into confrontation with the edge of the opening 13a of the casing 13. Then, the cartridge casing 22 is depressed downwardly at the front part, thereby being inserted or loaded at a predetermined position in the housing 13.

As a result, the cartridge casing 22 is pushed toward the left in FIG. 2 by the force of the spring 17. One end of the foil 31 comes into close contact with the distal end of the conductor 20. This contact electrically connects the stylus 21 to the conductor 20 through the foil 31.

The cover 35 is closed over the opening 13a. This closing of the cover 35 causes the adjust screw 37 to pass through the hole 22a of the cartridge casing 22. At this moment, the push-pin 37a formed at the lower end of the adjust screw 37 abuts against the upper part of the lever 23, thereby depressing it downwardly against the force of the spring 27. As a result, the lever 23 rotates unitarily with the pick-up arm 19, in the counterclockwise direction indicated in FIG. 2. The stylus 21 projects downwardly through a bottom hole of the cartridge casing 22. Thus, the stylus 21 is brought into contact with the surface of the video disc 12.

Thereupon, the ring-shaped damper 24 is compressed slightly between the lever 23 and the pick-up arm 19. Interrelatedly with the compressed deformation of the ring-shaped damper 24, the stylus 21 is elastically pressed against the surface of the video disc 12. A predetermined stylus pressure thus imparted to the stylus.

When the cartridge 15 is loaded into the pick-up apparatus housing 13, the disc member 34 is attracted to the magnet 18. The pick-up arm 19 is mechanically connected to the shafts 14a of the arm-stretcher 14. Accordingly, in this state, the pick-up arm 19 positively transmits the vibration of the arm-stretcher 14 through the piano wire 33. The proximal end of the pick-up arm 19 is held by the ring-shaped damper 25. Thus, the vertical vibration at the proximal end of the pick-up arm 19 are more positively prevented from occurring, as compared with a construction wherein the pick-up arm 19 is supported by only the piano wire 33.

By selective rotation of the screw 37, the stylus pressure of the stylus 21 can be adjusted. The stylus pressure of the stylus 21 is determined by an elastic force in accordance with the deformation of the ring-shaped damper 24. For instance, if the ring-shaped damper 24 has a spring constant 0.1/0.6, [gr/mm], and the adjust screw 37 has a pitch of 0.5 [mm/rev], one rotation of the screw is divided into 20 steps (each step corresponding to 18°). The stylus pressure can then be set to 3.125 mgr per step. Therefore, the stylus pressure may be adjusted with extremely high accuracy.

Next to be described is the detaching or removing of the pick-up cartridge 15 from the housing 13 of the pick-up apparatus 11.

The engagement between the slide knob 38 and the cover 35 will first be unlocked by sliding the slide knob 38 toward the left, as indicated in FIG. 2. Then, the cover 35 is lifted to open the opening 13a. Consequently, the lever 23 is no longer pressed downwardly by the adjust screw 37. The lever 23 rotates clockwise responsive to the force of the spring 27 until it abuts against the top plate of the cartridge casing 22 (as seen in FIG. 1). The pick-up arm 19 is rotated unitarily with the lever 23 and is retracted within the cartridge casing 22. Therefore, the ring-shaped damper 24 which is interposed between the lever 23 and the pick-up arm 19 does not deform or distort as a practical matter.

Then, the cartridge casing 22 is manipulated, with the frame part thereof being held, first toward the right and counter to the force of the spring 17. The front part of the casing 22 passes the edge 13a of the opening of the housing 13. Then, the cartridge casing 22 is rotated in the clockwise direction, as indicated in FIG. 1. Interrelatedly with the rotational displacement of the cartridge casing 22, the stopper 32 engages the leg parts 29 and 30 of the lever 23. The stopper 32 is therefore restricted in its right-ward movement. The disc member 34 is forced to separate from the magnet 18, counter to the magnetic force. Consequently, the cartridge 15 and the casing 13 become separate members, with mechanical connection being relieved. The pick-up cartridge 15 can be easily drawn out of the casing 13 of the pick-up apparatus 11.

As set forth, the pick-up cartridge 15 is arranged so that it can be attached to or detached from the housing 13 of the pick-up apparatus 11. Further, the dampers 24 and 25 elastically support the pick-up arm 19 and move unitarily with the pick-up arm 19 and the lever 23. When the cartridge 15 is not loaded, the rings 24, 25 are not subjected to any compressive deformation. Accordingly, the dampers 24 and 25 are never unnecessarily subjected to perpetual deformation which might eventually exceed the elastic limit thereof. Thus, the rings are able to impart the stylus pressure with accuracy in accordance with the amount that the adjust screw 37 is advanced at the time when the pick-up cartridge 15 is being operated.

In the pick-up apparatus 11 the dampers 24 and 25 are made of butyl rubber, which is a viscous and elastic material. The pick-up arm 19 faithfully follows the stylus 21 as it moves vertically and horizontally. Accordingly, the abrupt decrease of the resonance magnification factor at a resonance point of the mechanical impedance can be effectively prevented. Further, by presetting the spring constant of the dampers 24 and 25, the resonance magnification factor at the resonance point can be adjusted at around 1.3. The tracking errors are prevented from occurring.

Since the deformation of the dampers 24 and 25 can be finely and accurately adjusted, the adjustment of the stylus pressure of the stylus 21 is accurately accomplished, even if the spring constants of the dampers 24 and 25 are large. For this reason, the resonance frequency of the dampers 24 and 25 and the width of the dynamic range of the pick-up arm 19 can be selected arbitrarily.

The pick-up arm 19 is connected, at the proximal end thereof, through the piano wire 33 to the shaft 14a of the arm-stretcher 14 Jitter can be corrected in an extremely high frequency range. Moreover, since the pick-up arm 19 is supported, near its rotational center, by the damper 25, the secondary resonance of the piano wire 33 and the pick-up arm 19 can be prevented. This result further improves the jitter correction effect.

In the above described embodiment, the ring-shaped dampers 24 and 25 are fixed to the lever 23 with their frame planes identical with a vertical plane including the axis of the pick-up arm. Problems arise with this arrangement since the spring constants of the dampers, in the direction vertical to the recording surface, transversing the track are hardly determined independently. Groove skipping occurs because the stylus pressure exerting direction is inclined with respect to the surface of the record disc.

These problems are solved by the following embodiments.

Next, another embodiment of the pick-up cartridge, according to the present invention, will be described, in conjunction with FIG. 3 and the succeeding drawings.

In FIG. 3, an essential part 41 of the pick-up cartridge has a construction in which the pick-up arm 46 is supported at both of its ends, on the lever 45, through a damper 42 of Rahmen-construction and a damper 43 of a truss-construction.

The damper 42 is an elastic material which is formed into a quadrangle frame. This damper 42 is interposed between the lower surface of the distal end of the lever 45 and the distal end of the pick-up arm 46. The frame plane of the damper 42 is perpendicular to the axis of the pick-up arm 46. Further, the damper 42 has an intrinsic spring characteristic which is in accordance with the dimension and shape of the quandrangular frame sides 42a, 42b, 42c and 42d. Side 42a of the quadrangular frame 42 is adhesively fixed to the lower surface of the lever 45. Thus, the frame side 42b confronting with the side 42a is supported elastically by the remaining frame sides 42c and 42d, thereby enabling motions in the up and down, right and left, and back and forth directions. Accordingly, the pick-up arm 46 is elastically fitted into a recessed part 42h formed at around an intermediate point of the frame side 42b.

The damper 43 is an elastic material formed into a triangular frame. The damper 43 is interposed between the lower surface and near the end of the lever 45 and the pick-up arm 46. The frame plane is perpendicular to the axis of the pick-up arm 46. Further, the damper 43 also has an intrinsic spring characteristic in accordance with the dimension and shape of the frame sides 43a, 43b, and 43c of the triangle frame. The frame side 43a of the damper 43 is adhesively fixed to the lower surface of the lever 45. The pick-up arm 46 passes through and is cemented in a hole 43h formed at the apex of the frame sides 43b and 43c. Accordingly, the pick-up arm 46 is supported by the frame sides 43b and 43c in an elastic manner, particularly with respect to the back and forth directions. Here, there is a large spring force of the damper 43 in the up and down, and right and left directions. The vibration of the pick-up arm 46 in the above described directions at the proximal end is restricted effectively.

The stylus pressure of the stylus 47 is variably set at an appropriate value by changing the initial deformation amount of the damper 42.

When the damper 42 receives forces indicated by arrows X, Y, and Z in FIGS. 4a, 4b and 4c, the damper 42 develops compression, tension, and deflection deformations respectively, thereby being deformed into shapes peculiar to the frame construction. All of these deformations occur within the frame plane which is perpendicular to the axis of the pick-up arm 46. Further, the damper 42 deforms responsive to the compression and tension forces, in a symmetrical manner with respect to a vertical center line. The direction of force applied to the stylus 47 is, therefore, always perpendicular to the surface of the video disc. For this reason, the direction of force imparted by the damper 42 is deviated obliquely, thereby preventing groove skipping.

Moreover, there is an equal deformation on opposite sides of the frame when the damper 42 develops a deformation in the direction of the arrow Z as indicated in FIG. 4C. There is no phenomenon wherein only the frame side 42b confronting the above described frame side 42a deforms extremely. This is because the frame side 42b is held elastically by a pair of frame sides 42b and 42c. When the force applied in the direction of arrow Z is released, the damper 42 is restored smoothly to its original shape.

Further, the damper 42 is deformed in the direction of axis of the pick-up arm 46 (this deformation state is not illustrated). In this case, the frame sides 42b, 42c, and 42c of the damper 42 deform in a state which is not effected by the fixed connection of the frame side 42a and the lever 45. Accordingly, the spring constant of the damper 42, with respect to the elastic deformation in the axial direction, can be determined in accordance with the size and shape of each of the frame sides 42a through 42d. Axial deformation is independent of the spring constant in the up and down, and right and left directions.

Consequently, the pick-up apparatus incorporating the essential cartridge part 41 has a very high quality tracing and tracking characteristic, and it prevents jitter.

Further, jitter in the extremely high frequency range can be corrected effectively since the proximal part of the pick-up arm 46 is held by the truss-type damper 42 which deforms elastically in only the axial direction of the pick-up arm 46. Further, since the damper 43 is disposed near the rotational center of the pick-up arm 46, the secondary resonance of the piano wire 48 and the pick-up arm 46 is prevented. Thus, the above described jitter is prevented more effectively.

Moreover, large areas of the dampers 42 and 43 are fixed to the lever 45. Accordingly, the dampers 42 and 43 can be fixed to the lever 45 with accurate positioning. Thus, the pick-up arm 46 can be disposed in parallel to the lever 45.

In another embodiment illustrated in FIG. 5, an essential part 51 of the pick-up cartridge has an added frame damper 53 with a shape which is substantially equal to that of the damper 42. The added frame is intermediate frames 42, 43 in the longitudinal direction of the lever 52. A pick-up arm 54 is supported elastically at an intermediate part by the damper 53.

Therefore, the vibration of the pick-up arm 54 itself is prevented effectively. There is no abrupt increase of mechanical impedance of the pick-up arm 54 at a resonance point. Further, since the damper 53 is made of material having a small spring constant and a great attenuation, as compared with those of the damper 42, the tracking and tracing characteristics may be improved over a wide frequency range.

In this embodiment, a member 55 which provides for adjusting stylus pressure is threadably engaged at a proper position on the lever 52. The upper end of the stylus pressure adjusting member 55 engages the inner surface of the top wall of the cartridge casing. Accordingly, when the cartridge casing is not inserted into the apparatus, the rotational limit position of the lever 52 is restricted in accordance with the screw-in amount of the adjust member 55.

Figure 6:
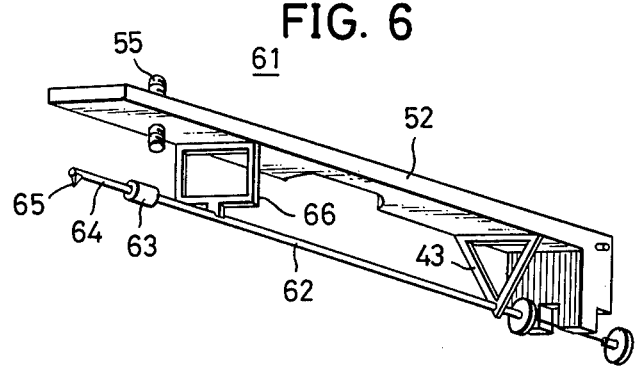

In a still another embodiment illustrated in FIG. 6, a pick-up cartridge essential part 61 has a construction in which a cantilever 64 is held or supported at the distal end of the pick-up arm 62 through a pipe-formed rubber damper 63. A stylus 65 is fixed to the lower surface of the cantilever 64 at the distal end thereof.

In accordance with the above described construction, the mechanical impedance of the stylus 65 increases up to a resonance frequency determined by the pick-up arm 62 and the rubber damper 63. However, the mechanical impedance decreases at the resonance frequency which is determined by the cantilever 64 and the rubber damper 63. Therefore, the stylus 65 follows vibrations extending up to the higher range, and also shows superior wear resisting characteristics.

Further, in the pick-up cartridge essential part 61, the pick-up arm 62 is connected through the pipe-formed damper 63 to the cantilever 64. Thus, the position of the stylus 65 can be adjusted in the back and forth direction, i.e., along the axis of the pick-up arm 62. The adjustment is made by adjusting the amount of the cantilever 64 which is inserted into the pipe-formed rubber damper 63. The accurate stylus pressure value is maintained. Moreover, the tracking and tracing characteristics of the pick-up arm 62 and the cantilever 64 can be improved with respect to the fluctuation of the rotating surface and the eccentric rotation of the disc, especially in a low frequency range where the frame-formed damper 66 hardly operates effectively.

Figures 7A, 7B:
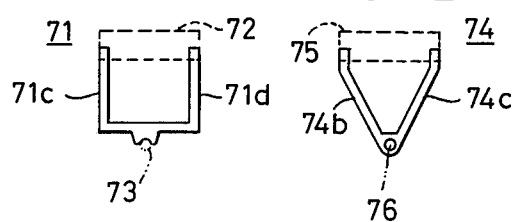
FIGS. 7A and 7B are elevations respectively showing further embodiments of a damper which may be fitted to the apparatus according to the present invention.

FIGS. 7A and 7B respectively show further embodiments of the damper.

Referring to FIG. 7A, a damper 71 has a generally U-shape, wherein the frame side 42a is omitted or removed from the above described damper 42. Damper 71 is embedded, at the frame sides 71c and 71d, into the lever 72 thereby completing the damper frame construction, with the lever 72 forming the top side of the frame. The pick-up arm 73 is supported elastically, with a predetermined spring force, with respect to the lever 72, which is similar to the support of the damper 42.

Referring to FIG. 7B, a damper 74 has a generally V-shape wherein the frame beam 43a is omitted from the above described damper 43. Damper 74 is embedded, at the frame sides 74a and 74b, into the lever 75 thereby completing the frame construction, with the lever 75 forming the top side of the frame. The pick-up arm 73 is thus supported elastically, with a predetermined spring force, with respect to the lever 75, which is similar to the support of the damper 43.

Moreover, in the present invention, the shape of the damper is not limited to the quadrangle or triangle as indicated in each embodiment described hereinbefore. Other shapes such as ellipse, semicircle, half-ellipse, and U-shape etc. may also be used. That is, any damper having a shape which may be fixed to the lever with the frame plane perpendicular to the axis of the pick-up arm may be used.

Further, this invention is not limited to these embodiments. Variations and modifications may be made without departing from the scope and spirit of the invention.

What is claimed is:

1. A signal pick-up apparatus for reproducing a recording disc, comprising:
   a pick-up cartridge comprising a pick-up cartridge casing detachably loaded at a predetermined position on a pick-up apparatus structure,
   a rigid stylus arm support member rotatably supported at one end thereof within said casing,
   a pick-up arm having a distal end with a reproducing stylus mounted thereon to make contact with a recording disc,
   elastic means for supporting said pick-up arm with respect to said arm support member, and
   means within said casing for urging said stylus arm support member in a direction for retracting said pick-up arm away from said recording disc with a predetermined relationship between the stylus arm support member and the pick-up arm; and
   depressing means on the apparatus structure for depressing the other end of the stylus arm support member without changing said predetermined relationship when the pick-up cartridge is loaded into the predetermined position on the apparatus structure, said depression being in a direction for causing the reproducing stylus of said pick-up arm to contact the recording disc and further causing said elastic means to deform only after the stylus makes contact with the recording disc.

2. A signal pick-up apparatus as claimed in claim 1 in which said casing contains a hole at a position confronting the other end of said arm support member, and said depressing means comprises a cover for said casing, and depressing means on said cover having a push-pin for passing through the hole of said casing and depressing said arm support member.

3. A signal pick-up apparatus as claimed in claim 2 in which said stylus arm support member further comprises a screw which threadably engages said member, the projection of said screw changing by an amount which is determined by a rotation thereof, and said stylus arm support member abuts said push-pin.

4. A signal pick-up apparatus as claimed in claim 1 in which said depressing means comprises a screw member threadably engaged with said cover and having said push-pin projecting from the end thereof for adjusting stylus pressure, said screw member enabling an adjustment of the amount of said push-pin which projects downwardly from said cover in accordance with a rotational position of the screw.

5. A signal pick-up apparatus for reproducing a recording disc, comprising:
   a pick-up cartridge comprising a pick-up cartridge casing detachably loaded at a predetermined position on a pick-up apparatus structure,
   a stylus arm support member rotatably supported at one end thereof within said casing,
   a pick-up arm having a distal end with a reproducing stylus mounted thereon to make contact with a recording disc, elastic means for supporting said pick-up arm with respect to said arm support member, and
   means for urging said arm support member in a direction for retracting said pick-up arm within said casing; and
   depressing means on the apparatus structure for depressing the other end of the stylus arm support member when the pick-up cartridge is loaded into the predetermined position on the apparatus structure, said depression being in a direction for causing the reproducing stylus of said pick-up arm to contact the recording disc and further causing said elastic means to deform after the stylus makes contact with the recording disc;
   said elastic means comprising at least two rings made of elastic material, said rings being positioned at least near both ends of said pick-up arm to said arm support member.

6. A signal pick-up apparatus as claimed in claim 5 in which said damper is fitted to said arm support member in such a manner that a frame plane of the damper is substantially perpendicular to the longitudinal direction of said pick-up arm.

7. A signal pick-up apparatus as claimed in claim 6 in which said damper is a quadrangular frame-shaped damper which is positioned near the distal end of said pick-up arm.

8. A signal pick-up apparatus as claimed in claim 6 in which said damper is a triangular frame-shaped damper which is positioned near the proximal end of said pick-up arm.

9. A signal pick-up apparatus as claimed in claim 6 in which said damper has a frame shape with an omission of one frame side which confronts said arm support member, the ends of said frame confronting said arm being fixed to said arm, whereby said omitted frame side is provided by the arm support member.

10. A signal pick-up apparatus for reproducing a recording disc, comprising:
    a pick-up cartridge comprising a pick-up cartridge casing detachably loaded at a predetermined position on a pick-up apparatus structure,
    a stylus arm support member rotatably supported at one end thereof within said casing,
    a pick-up arm having a distal end with a reproducing stylus mounted thereon to make contact with a recording disc, elastic means for supporting said pick-up arm with respect to said arm support member, and means for urging said arm support member in a direction for retracting said pick-up arm within said casing; and depressing means on the apparatus structure for depressing the other end of the stylus arm support member when the pick-up cartridge is loaded into the predetermined position of the apparatus structure, said depression being in a direction for causing the reproducing stylus of said pick-up arm to contact the recording disc and further causing said elastic means to deform after the stylus makes contact with the recording disc;
    said elastic means comprising at least two frame-shaped dampers made of elastic material, said frames being positioned at least near both ends of said pickup arm to said arm support member.

* * * * *